US008768065B2

(12) United States Patent
Melikian (10) Patent No.: US 8,768,065 B2
(45) Date of Patent: *Jul. 1, 2014

(54) SYSTEM AND METHOD FOR VISUAL RECOGNITION (76) Inventor: Simon Melikian, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,370

(22) Filed: Apr. 2, 2012

(65) Prior Publication Data

US 2012/0213444 A1 Aug. 23, 2012

Related U.S. Application Data (63) Continuation of application No. 12/101,583, filed on Apr. 11, 2008, now Pat. No. 8,150,165.

(51) Int. Cl.
G06K 9/66 (2006.01)

(52) U.S. Cl.
USPC .............................. 382/195; 382/218; 382/278

(58) Field of Classification Search
CPC ................ G06K 9/00543; G06K 9/56; G06K 2009/4666; G06F 17/30217
USPC .......................... 382/195, 204, 205, 218, 278
See application file for complete search history.

(56) References Cited

U.S. PATENT DOCUMENTS 5,621,825 A * 4/1997 Masaki et al. ................. 382/274
6,477,275 B1 * 11/2002 Melikian et al. .............. 382/217
6,493,470 B1 * 12/2002 Ikeda et al. ................... 382/289
6,636,634 B2 * 10/2003 Melikian et al. .............. 382/217
6,717,996 B1 * 4/2004 Du Reau et al. .............. 375/343
7,006,694 B1 * 2/2006 Melikian et al. .............. 382/199
7,046,822 B1 * 5/2006 Knoeppel et al. ............. 382/103
7,848,566 B2 * 12/2010 Schneiderman ............... 382/159
7,903,141 B1 * 3/2011 Mariano et al. ............... 348/143
8,144,193 B2 * 3/2012 Melikian ......................... 348/90
8,150,165 B2 * 4/2012 Melikian ........................ 382/190
8,165,407 B1 * 4/2012 Khosla et al. ................. 382/224
8,442,321 B1 * 5/2013 Chang et al. .................. 382/181
2003/0212652 A1 * 11/2003 Gold .................................. 707/1
2007/0179918 A1 * 8/2007 Heisele et al. ................... 706/13
2008/0071710 A1 * 3/2008 Serre et al. ....................... 706/20
2008/0101516 A1 * 5/2008 Cho et al. ....................... 375/359
2009/0067730 A1 * 3/2009 Schneiderman ............... 382/224
2010/0021067 A1 * 1/2010 Otsu et al. ..................... 382/195
2011/0069896 A1 * 3/2011 Ishiga ........................... 382/224
2011/0293187 A1 * 12/2011 Sarkar et al. .................. 382/190
2012/0106857 A1 * 5/2012 Schneiderman ............... 382/224

* cited by examiner

Primary Examiner — Aaron W Carter
(74) Attorney, Agent, or Firm — Renner, Otto, Boisselle & Sklar, LLP.

(57) ABSTRACT

A method for visual recognition of an object in an electronic image includes extracting unique points of an object to be learned and/or a target object. The unique points are obtained by cross-correlating the image with a structure. Generally, the structure and/or the size of the structure may vary to detect extremum information associated with the learned object and/or target object. An icon corresponding to each of the unique points is extracted. The size of the icon corresponds to the scale of the unique point. After extraction of the various icons, an object becomes a collection of icons. Each of these icons is un-rotated and normalized or resized to a constant size so it can be compared with other icons.

15 Claims, 12 Drawing Sheets

A cross section of cone like structure at two different sizes (scales)

FIG. 1A

A cross section of a "steel plate" with 3 hole of difference sizes (scale) to represent a structure in an image.

FIG. 1B

Fitting Cones into holes

FIG. 1C

Showing the distance of how far the cone structure can go inside a hole (distance "d") (corresponds to correlation)

FIG. 1D

Cone-like structure at different scale

SYSTEM AND METHOD FOR VISUAL RECOGNITION

RELATED APPLICATION DATA

This is a continuation application of application Ser. No. 12/101,583, filed on Apr. 11, 2008 and issued as U.S. Pat. No. 8,150,165 on Apr. 3, 2012.

TECHNICAL FIELD OF THE INVENTION

The present invention relates to the field of computer vision, and more particularly, to a system and method for visual recognition for use in a wide variety of applications.

DESCRIPTION OF THE RELATED ART

Computer vision generally relates to the theory and technology for building artificial systems that obtain information from images or multi-dimensional data. As used herein "information" means anything that enables a decision to be fully and/or partially based. Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), etc.

A goal of computer vision is to make a computer truly "see" just like humans do. Understanding the content of everyday images and videos is one of the fundamental challenges of computer vision. In order to make a computer "see" in an unconstrained environment an extraordinary amount of computational power, perhaps on the order of $10^{15}$ operations per second likely is needed. Even if such a speed was possible in a commercial computer vision system, it is difficult to perform rapid visual searches in unconstrained, natural environments.

To make search and recognition tasks tractable in commercial computer vision, designers typically limit the task's visual complexity. This may be done in a variety of ways. For example, the vision system may be set up to view and recognize only one or a small class of objects. Second, the presentation (position, orientation, size, view, etc.) of these objects is strictly controlled. Thus, the object variability is limited to the point that the vast majority of variables are eliminated and the search can be implemented with reasonable cost in terms of both computing time and money.

Computer vision systems generally lack the knowledge needed to constrain and interpret a general visual search (e.g., searches performed in an uncontrolled environment). Therefore, practical computer vision search requires the designer to drastically restrict what the vision system sees and to add a priori knowledge about what it will see so that it can interpret the result. Thus, a major drawback to computer vision in real world applications is the time, money and specialized knowledge needed for such applications to be adequately performed.

The evolution of computer vision in the last twenty years was driven by improvements in hardware and algorithms. A variety of computer vision methods have been developed for image detection (also referred to herein as pattern recognition). These techniques include, for example, using binary images to represent gray scale images, normalized grayscale correlation, blob analysis, geometric based search and recognition, contour based search, affine invariant constellation based recognition, corner detection, salient icon detection, scale invariant feature transform, etc.

SUMMARY

A strong need exists in the art of computer vision to recognize objects in an image or image sequence similar to vision in human beings. For example, in an airport, an unmanned vehicle needs to recognize other vehicles and obstacles so it can avoid and/or maneuver through the airport. In an unmanned vehicle or other robotic vision application, the robotic application generally needs to "see" the pathway and navigate autonomously or land autonomously.

In visual recognition, achieving invariance to object presentation (position, orientation, distance (scale), and perspective), lighting, occlusion and background is challenging. Aspects of the present invention provide excellent invariance to object presentation, lighting, occlusion and background and generalization for true object recognition.

The human brain processes visual information associated with objects with full independency of the position, orientation, distance (scale), and perspective. For example, if a human being views a "soda pop can", the human can recognize it regardless of the distance and/or orientation (e.g., distance from can, rotation, tipped, tilted, etc.). The brain essentially "normalizes the view". Humans are capable of learning a large number of objects and easily retrieve the learned objects. Aspects of the present invention allow learning virtually an unlimited number of objects and recognizing any one of these learned object(s) regardless of object presentation. This is analogous to human visual recognition capability. For example, aspects of the invention enables the recognition of hundreds of trained objects very quickly (e.g., in less than a second) and fundamentally has no limit in learning and recognizing millions of objects. This capability stems from the ability to extract the same icons (image patches) from an image of an object regardless of distance, rotation, presentation that the object is in relation to the viewer and/or the device acquiring the image or series of images.

Aspects of the invention relate to extracting unique points (e.g., x and y coordinate points) in an image. Each one of these unique points has its own unique scale (e.g., size) and orientation that is related directly to the presentation of the object. Having scale and orientation information measured per unique point enables visual recognition that is fully invariant to presentation. In other words, when an object is closer, farther, rotated, tipped, and/or tilted, these unique points have similar relative locations to the object and a unique scale that is related to how close/far the object is and rotation values that are related directly to the object planar rotation. Basically these unique points "normalize the view" of the object.

An icon (image patch) from an image of an object is extracted from each of these unique points. The size of the icon corresponds to the scale of the unique point. And the angle of the icon is the angle of the unique point. After extraction of the various icons, an object becomes a collection of icons. Each of these icons is un-rotated by icon angle and resized to a constant size so it can be compared (distance measure such as absolute difference) one-to-one with other icon (also referred to herein as "normalized". It has been determined that the icons are virtually identical regardless of object presentation. In other words, the icons (image patches)

are the same whether the object is close or far, rotated, tilted, and/or tipped. One of the unique properties of these icons is their stability over scale and angle. Comparing an icon for similarity may also include color information. Generally, when comparing two icons, each icon may also be intensity-normalized.

Searching for an object in database of learned object's images becomes a search of vectors associated with learned object's images. Indexing techniques are one way represent an image for searching.

Computing geometric transformation between a learned object and a found object is done by computing the transformation between the corresponding learned icon's position and found icon's position, as discussed below. The transformation matrix between learned object and found object is computed using a perspective matrix using least square of all corresponding icons positions or by picking two sets of quad icons position from the learned and found objects. Based on rigid body assumptions, every set of four icons can compute a perspective matrix. Many sets of four icons give the same transformation, which provides a robust measure of correct match, also referred to herein as, measure redundancy, as discussed below.

One aspect of the present invention relates to a method for visual recognition of at least one object in an image, the method comprising: providing an image in an electronic format, wherein the image includes at least one object to be learned; generating extremum information associated with the image by cross-correlating at least one structure across at least a portion of the image, wherein the extremum information includes at least one coordinate point associated with cross-correlating the at least one structure across the image; extracting at least one icon from the image, wherein the icon includes the coordinate point associated with the extremum information; determining an angle associated with the at least one icon; normalizing the icon to a fixed size; and storing icon information in a computer readable form, wherein the icon information includes image values associated with at least a portion of the icon; the at least one coordinate point associated with the extremum information; and the angle associated with the at least one icon.

Another aspect of the invention relates to a method for matching a learned object with a target object, the method comprising: providing at least one learned object and at least one target object, wherein the learned object and the target object; extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches a learned object.

Another aspect of the invention relates to a program stored on a machine readable medium, the program being suitable for use in matching a learned object with a target object, wherein when the program is loaded in memory of an associated computer and executed, causes extracting unique points from the target object, wherein the unique points are generated from extremum information obtained from the target image by cross-correlating at least one structure across the target image; extracting an icon of the target image corresponding to each of the unique points; determining an angle associated with the at least one icon; normalizing the extracted icon; and determining if the extracted icon from the target images matches the learned object.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to a system and method for pattern identification of a learned image (or learned pattern) in a target image. Unique and stable points (e.g., x and y coordinate points) are extracted from an image of an object, regardless of object presentation. The uniqueness of the extracted points comes from the fact that these points have the same relative position in the object regardless of distance, orientation (e.g., tip, tilt, rotation, etc.) and illumination of the object from the viewer or viewing device. In other words, the extracted points are invariant to object presentation.

Early computer vision algorithms generally used an image subtraction method (also referred to as golden template matching) as a primitive method of recognition. Image subtraction is a form of distance measure between two images. For the image subtraction method to work, the object in the learned image has to be nearly identical to the object in the target (scene) image. For example, the object generally has to be in the same position, same scale, same planar angle, etc. as the learned object. Any shift in location or other transformations would produce a false result. Such conditions were generally needed because the subtraction method simply subtracted pixel values having coordinates in one image with pixel values located at corresponding coordinates in another image.

If a method can find regions in an object image that are the same regardless of object presentation, it is conceivable that the golden template concept may be used to recognize regions of that object, which could result in recognizing the entire object. Prior methods to find these unique points and associated icons produced either unstable points in position, unstable scale, and/or unstable angle. The prior methods produced few inliers and majority of outliers, which makes pattern recognition generally problematic. Researchers in academia have experimented with several types of these unique points. Example of some of the famous type of these points are, Harris-Corner-Detector, Harris-Laplace, Laplacian-of-Gaussian, SIFT (Difference of Gaussian). Generally these detectors lack stability in position, scale and angle, which produces various problems during the recognition process. For example, these prior methods produce hundreds and/or thousands of unique points and only a handful of such points may survive from one object position to another to aid in pattern recognition.

An invariant point in an image generally needs to have the characteristic of extremum for some metric. For example, in a one dimensional signal, such as a parabola, the peak point of a parabola is an invariant point regardless to the parabola's parameters (e.g., regardless to how wide, narrow, shifted, or rotated a parabola is).

Referring to FIGS. 1A-1D, an exemplary method 10 of extracting unique and highly stable points (e.g., x and y coordinate points) is illustrated. These points are highly stable in position, scale, and angle. Accordingly, such points are referred to herein as scale rotation invariant (SRI) points (and/or SRIP). One way of extracting the SRI points is by cross correlating the object image by a structure 12. Cross-correlation is generally a measure of the similarity of two signals. Cross-correlation is commonly used to find features in an unknown signal by comparing it to a known one. It is a function of the relative time between the signals and is sometimes called the sliding dot product.

Figure 1A:
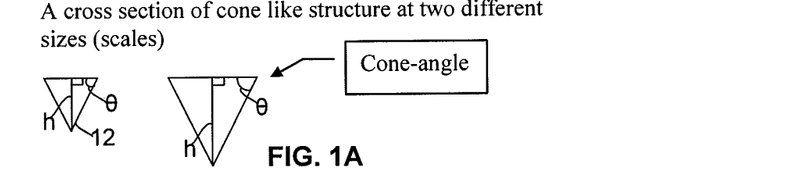
FIGS. 1A-1D is an exemplary illustration of a structure and correlation method in accordance with aspects of the present invention.

Structure 12 may be circular, conic or Gaussian shape. In one embodiment, the structure 12 is a cone-like structure. Referring to FIG. 1A, the cone-like structure 12 is illustrated in two dimensions.

The cone-like structure 12 has a cone angle θ that generally corresponds to the height (h) of the structure 12. For example, SRI points generally have very interesting properties that aid in recognition. Based on correlation score between cone-like structure (or any other desired structure) and the image: a correlation score close to 1.0 identifies round structures; a correlation score of about 0.5 identifies strip like structures; and a correlation score of about 0.7 identifies an end of strip like structure. One of ordinary skill in the art will readily appreciate that the shape of the structure chosen may correspond to a change in correlation score for the identified structure.

Figure 1B:
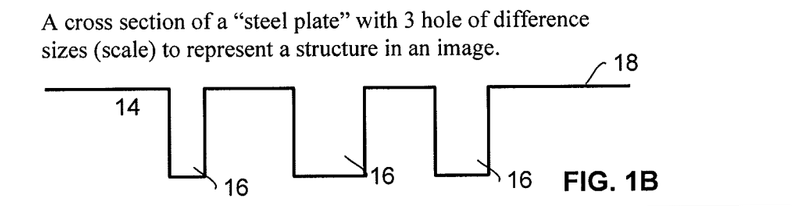

Referring to FIG. 1B, a "steel plate" 14 is illustrated. The steel plate 14 has holes 16 of varying sizes along a surface 18. The steel plate is analogous to the object image or scene image.

Figure 1C:
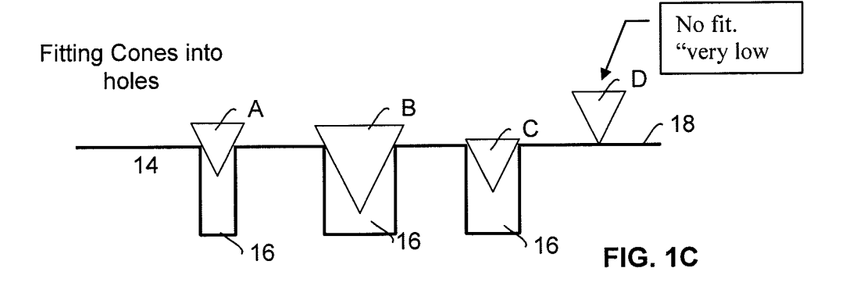

The structure 12 is attempted to be "inserted" into the steel plate 14 in a scanned manner (e.g., one pixel after another pixel). As shown in FIG. 1C, the cone-like structure 12 is illustrated being inserted into a "steel plate" 14, for purposes of illustration. One goal is to find holes (or other meaningful structure) by poking (in a scanned way) (i.e., pixel by pixel and/or group of pixels by group of pixels) the structure 12 (e.g., a cone-shape pin) into the steel plate. The structure 12 (e.g., the cone-like shape is the known cross-correlation image) is used to generate the unique points. If a point on the surface 18 does not contain a hole, the pin does not go into the steel plate 14, which yields a low score correlation match (e.g., see "D" in FIG. 1C). Referring to FIG. 1C, if structure 12 is inserted (or poked) into a hole, the cone would go in some distance depending on the pin conic size and hole size in the plate. For example at "A", the structure 12 extends into the hole 16 approximately half-way. At "C", the structure 12, which is substantially the same size as the structure at "A", extends almost fully into the hole. Accordingly, "C" has a higher correlation than "A". Also, note that at "B", a larger structure 12 than was used at "A" and "C" is illustrated. The larger structure extends approximately 80% into the hole 16, at "B". If the same sized structure used at "A" and "C" were inserted into the hole at "B", the structure would hit the bottom without touching any of the walls associated with the hole 16 and, therefore, not have a strong correlation, no extremum. In one embodiment, it is desirable to cross-correlate an image with structures having a variety of scales in order to identify all or at least a portion of the extremum information available on the image.

Figure 1D:
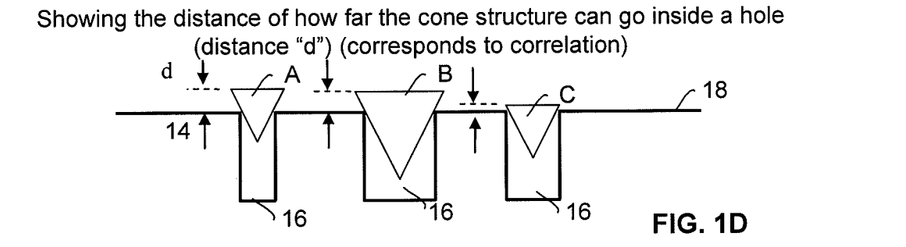

Referring to FIG. 1D, the amount that the cone goes inside (e.g., correlation match score) is related to the structure, cone-angle, and the size of the hole, or the structure. For example, this can be view as a two dimensional frequency analysis of an image. The result of cross correlating a cone structure with the image at a different scale is a set of coordinate points (x,y) and unique radius (scale) for each of these points. The radius value is directly related to the scale of the image and to the size of the structure around the coordinate point.

Figure 2:
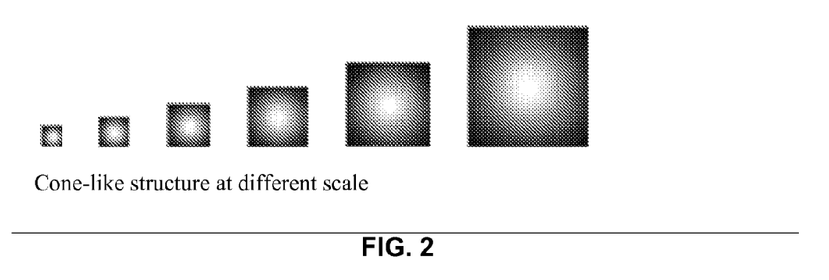
FIG. 2 is an exemplary illustration of a structure having various scales in accordance with aspect of the present invention.

FIG. 2 illustrates the cone-like structure 12 in a two-dimensional image for six different scales. The scale size may be any desirable size for each of the various structures used to identify the SRI points. The SRI points for each of the various structure sizes will generally vary when cross-correlated with an image. The collection of SRI points for all of the structure sizes is generally used to define the object, as discussed below. For example, the scale size of the structure 12 may vary from a point contact (e.g., 5×5 pixel) to the size of the image and/or object of interest. The gradations in color change correspond to the height of the cone-like structure 12

FIGS. 3A-3G illustrate an exemplary image that has been cross-correlated with a structure 12 of varying cone size (scale) (e.g., cone-like structures illustrated in FIGS. 1 and 2). The exemplary image may be any digital image, a portion of an object or image, an electronic representation of an image, etc. As shown, in FIGS. 3A-3G, the image is a digital image of an object. It may be desirable for a machine to determine the precise location and/or orientation of one or more items (or patterns) in this scene. This information may be used in any desirable manner. For example, the information may be used so that a controller, a device, or other electronic device may properly interact with software that is capable of detecting optical objects in order to facilitate controlling, locating, assembling and/or processing information related to the item.

Once the image has been cross-correlated, a resulting set of unique points (also referred to herein as x and y coordinate points) and radius values (scale) for each of the points are obtained, as is illustrated by the white circles in each of the images. As stated above, any structure 12 may be used in accordance with aspects of the present invention. For example, a two dimensional Gaussian provided similar results as the cone-like structure. The cone-like structure 12 is utilized to find extremum in the object regardless of scale. This provides robust and reliable relative localization (e.g., x and y coordinate positions in the image), and scale.

Figure 3A:
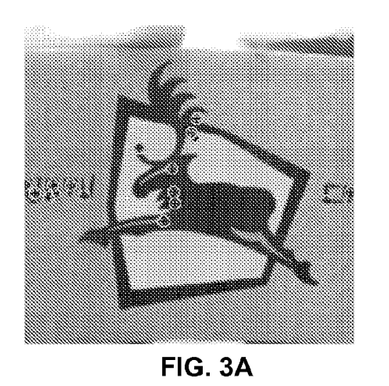
FIGS. 3A-3N illustrate correlation results and corresponding extremum information associated therewith in accordance with aspects of the present invention.
Figure 3B:
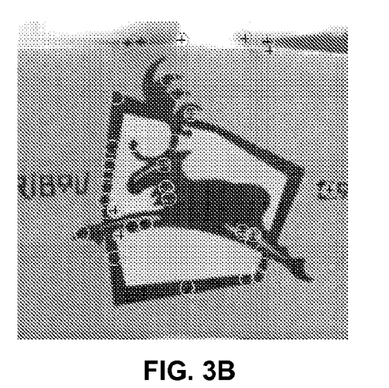
Figure 3C:
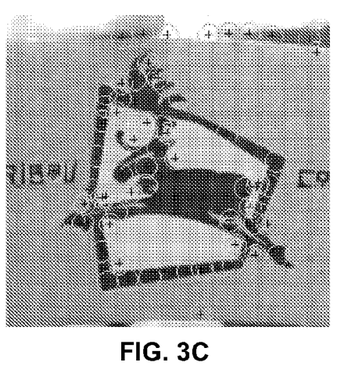
Figure 3D:
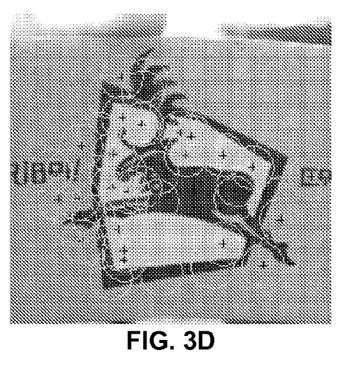
Figure 3E:
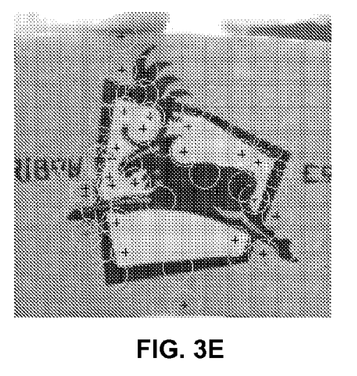
Figure 3F:
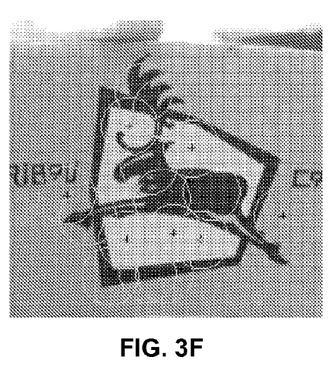
Figure 3G:
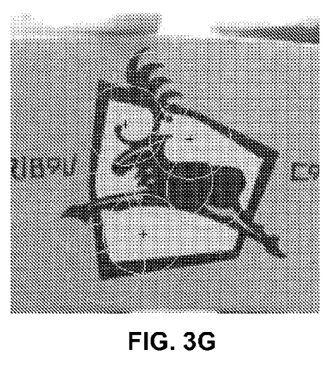
Figure 3H:
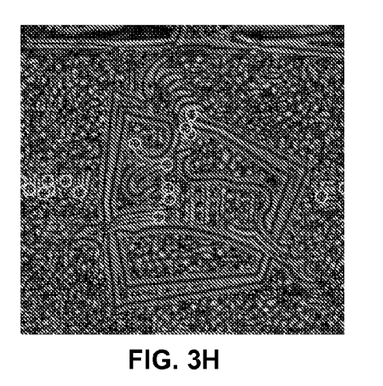
Figure 3I:
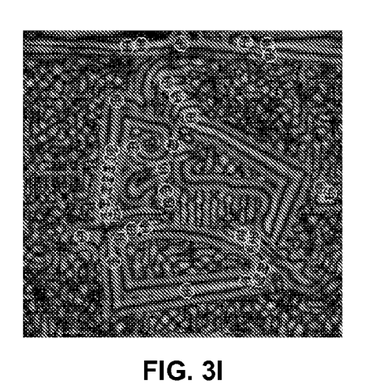
Figure 3J:
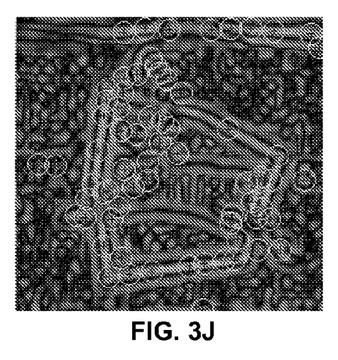
Figure 3K:
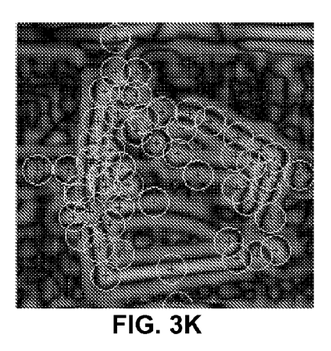
Figure 3L:
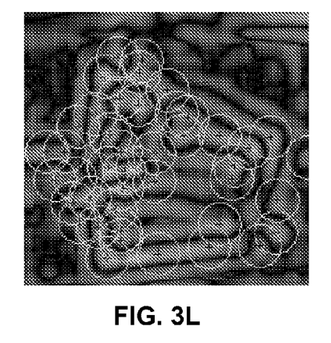
Figure 3M:
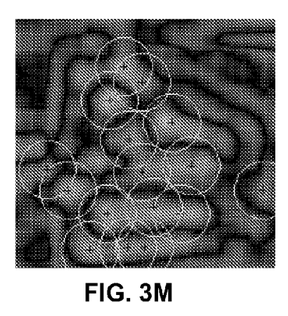
Figure 3N:
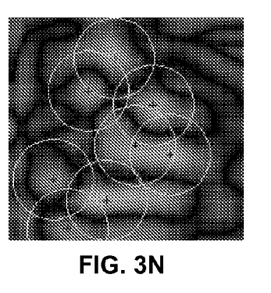

Once the correlation image is computed a peak detector is applied to find the coordinate of peaks in sub pixel form, as illustrated in FIGS. 3H-N. FIG. 3H identifies the extremum corresponding to FIG. 3A; FIG. 3I identifies the extremum corresponding to FIG. 3B; FIG. 3J identifies the extremum corresponding to FIG. 3C; FIG. 3K identifies the extremum corresponding to FIG. 3E; FIG. 3L identifies the extremum corresponding to FIG. 3D; FIG. 3M identifies the extremum corresponding to FIG. 3F; and FIG. 3N identifies the extremum corresponding to FIG. 3G. The cone-like structure 12 is a rotational invariant extremum detector for range of scales. In addition, the cone-like structure 12 also offers superior position localization regardless of scale.

Figure 4A:
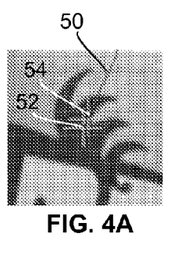
FIGS. 4A and 4B illustrate icon angle vectors in accordance with aspects of the present invention.
Figure 4B:
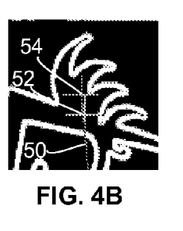

Once the unique points (e.g., coordinate values) are determined, an icon (image patch) is extracted from the associated at each of these coordinates. The icon size is proportional to the radius (scale) of the cone structure having a high cross-correlation match value. The angle of the icon 50 is computed from a vector between the unique point position 54 and the grayscale centroid position 52 of the icon at scale, as shown in FIGS. 4A and 4B. As shown in FIG. 4A, icon angle computation is based on the gray scale centroid using the raw image of the icon, for example. Icon angle computation may also be based on the edge detected image of the icon, as shown in FIG. 4B. The angle of the icon is the vector from the center of icon to the grayscale centroid. The grayscale centroid can also be applied on the raw image (e.g., such as Sobel or Canny edge detection).

Figure 5:
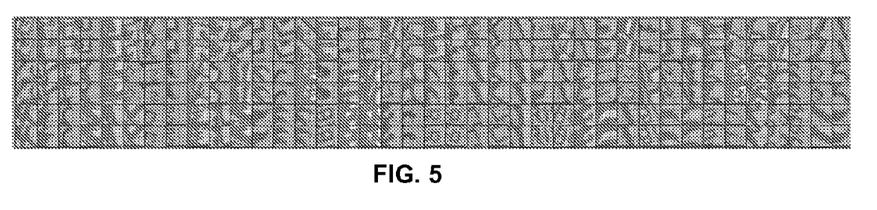
FIG. 5 is an exemplary illustration of normalized icons obtained in accordance with aspects of the present invention.
Figure 6A:
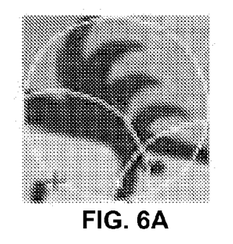
FIGS. 6A and 6B illustrate exemplary icons in accordance with aspects of the present invention.
Figure 6B:
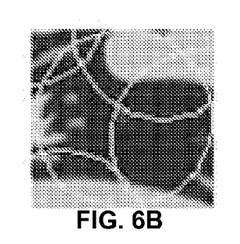

Once extracted, each one of the icons is normalized to a fixed size, as shown in FIG. 5. FIG. 5 illustrates the set of icons extracted from the image at each coordinate point for each scale associated with the structure. For example, FIG. 5 illustrates a matrix of normalized icons. The purpose of normalizing these icons into constant size is to be able to compare them with other icons (for the purpose of finding similar icons in database of icons, thus similar objects), by simply computing the difference between the two images as in the "golden template matching". Another method to compare these icons is by creating descriptor vector and then comparing these descriptors using distance measure between vectors. For example, the icon of FIG. 6A may be described in descriptor vector format as: 6,17,22,23,16,0,0,11,3,26,25,3,0,0,20, 20,6,5,4,10,5,60,0,7,6,14,4,12,9,22,12,16. Likewise, the icon of FIG. 6B may be described in descriptor vector format as: 13,7,21,11,4,5,24,11,0,58,38,0,0,0,2,0,0,5,20,11,4,28, 28,1,7,6,0,0,0,84,1,0. One of ordinary skill in the art will readily appreciate that there are many ways to compute icon descriptors (e.g., histogram of gradient angle, principle component analyses (PCA), etc.).

Figure 7A:
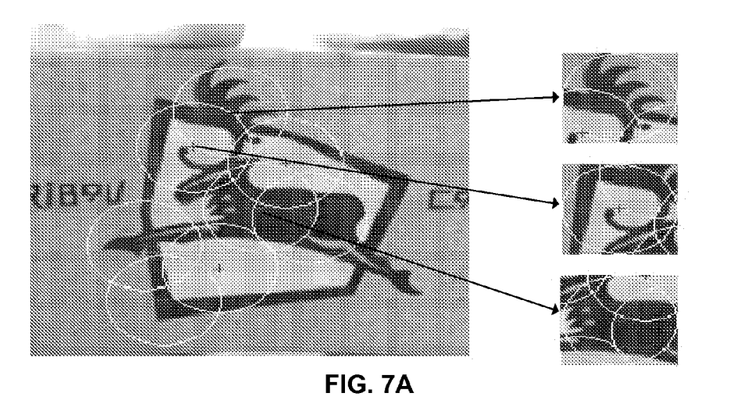
FIGS. 7A-7C illustrate exemplary icons in accordance with aspects of the present invention.
Figure 7B:
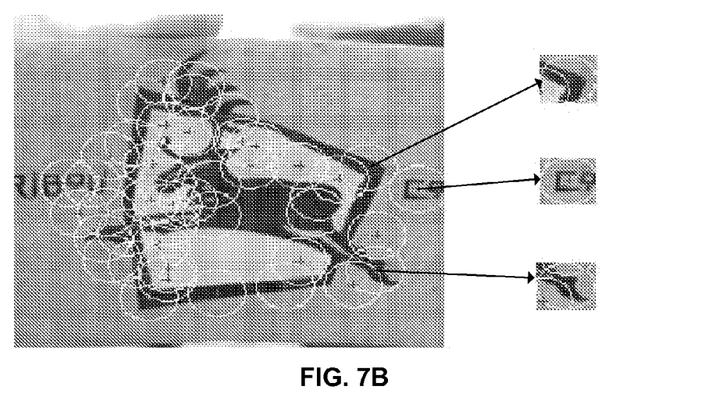
Figure 7C:
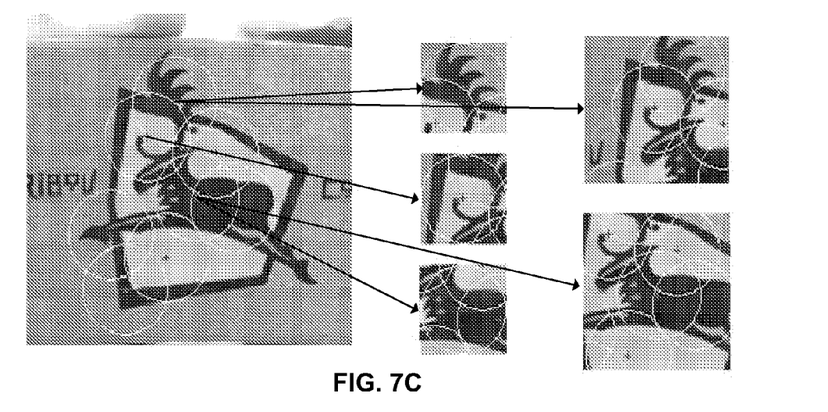

Each learned object may be described by a set of icons. Each icon generally includes one or more values, for example: (x,y) coordinate position, a size that correspond to the size of the image structure from which the icon originated from, and an angle. For example, FIGS. 7A-7C illustrates various icons extracted from a correlation of structures having various sizes. The spatial relation of these icons is insured by the outline of the object. These icons may be stored in any electronic storage device. For example, the icons may be stored in a database of icons that generally includes an identifier, which is tagged and/or otherwise associated to a specific learned object. In another embodiment, a descriptor associated with each of the icons is stored in a database or other suitable data storage medium. In another embodiment, icons may also be extracted at multiple-scale values that produce multiple icons per unique points, as opposed to extracting icons only at the cone-structure-scale. For example, if the cone-structure scale is 32×32 pixels, then extract icons at 32×32 pixels and 48×48 pixels, as illustrated in FIG. 7C. This method generally guarantees true correspondence and recognition from a very few number of icons. In fact, in many situations only one unique icon may be needed to determine recognition of the object.

Figure 8A:
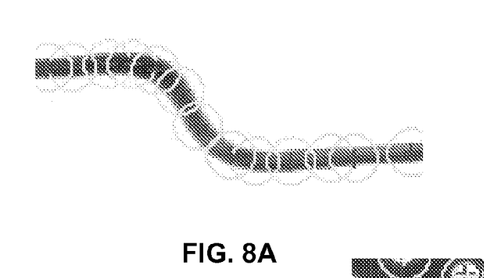
FIGS. 8A-8C illustrate exemplary structures in accordance with aspects of the present invention.
Figure 8B:
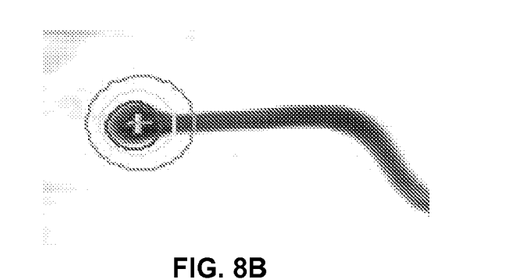
Figure 8C:
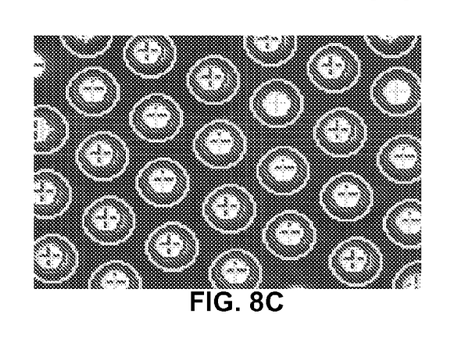

FIGS. 8A-8C illustrate one process of extracting unique points from an image. In FIG. 8A, unique points are extracted along a strip like region with correlation score of about 0.5. FIG. 8B illustrates the end of a strip and has a correlation score of about 0.7. FIG. 8C illustrates many round objects being extracted. The correlation score with the round objects is approximately 1, indicating that the round objects highly correlate with the structure (e.g., the cone-like structure) selected for cross-correlating.

Figure 9:
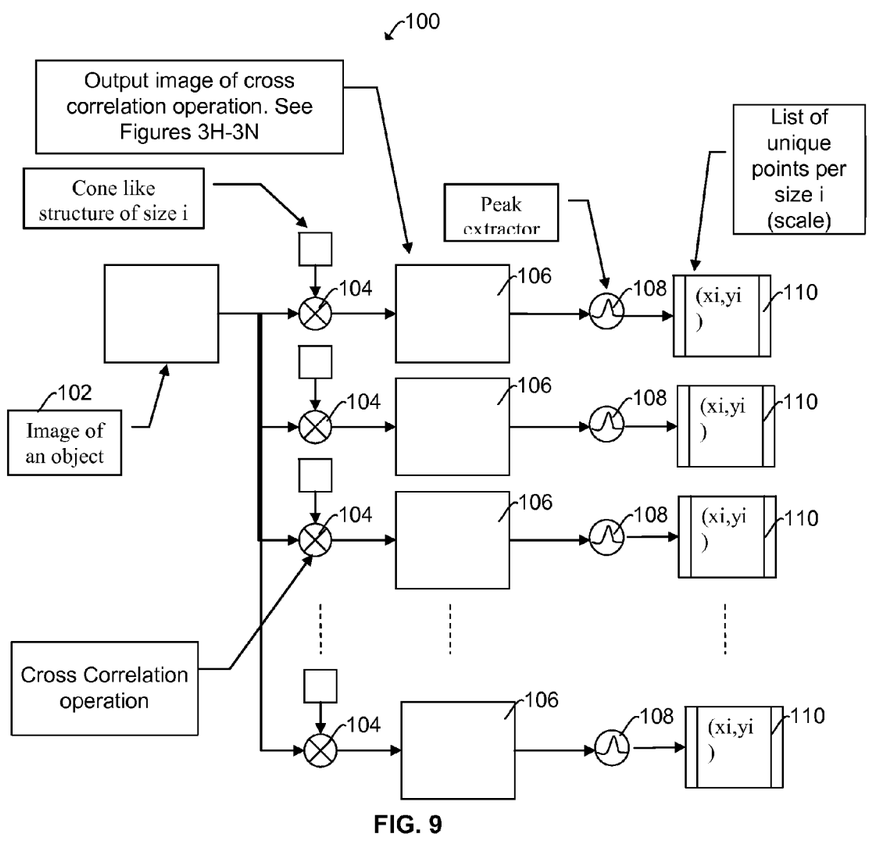
FIG. 9-13 are exemplary methods in accordance with aspects of the present invention.

FIG. 9 illustrates one exemplary method 100 for extracting scale and rotation invariant icons from an image. At block 102, an image of an object is provided in electronic form. The image may be in any suitable electronic format (e.g. JPEG, TIFF, PDF, bitmap, etc.) At block 104, the image of an object is cross-correlated with one or more structures 12 (e.g., cone-like structures), as described above. At block 106, output image of cross-correlation operation is obtained for each of the cross-correlation structures. At block 108, peak values are extracted for each of the cross-correlation structures. At block 110, a list of coordinate points per cross-correlation structure is obtained and stored in a memory.

Figure 10:
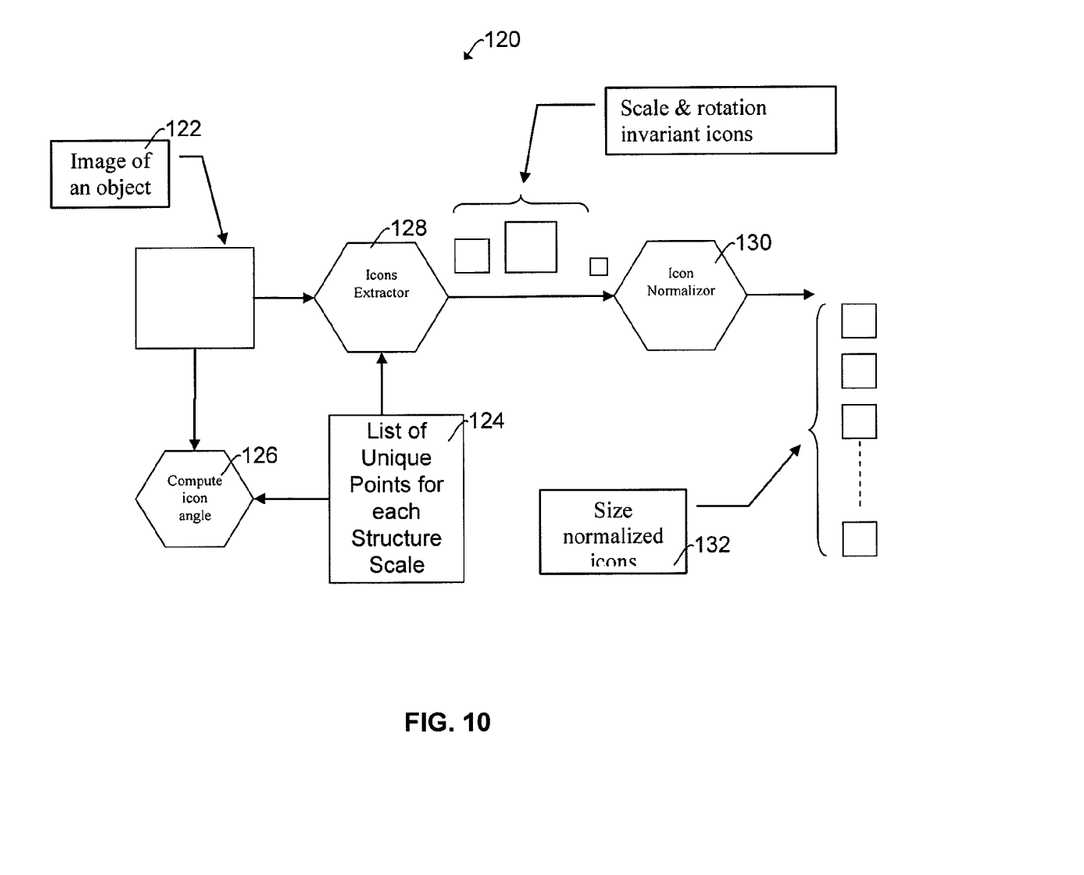

FIG. 10 illustrates one exemplary method 120 for extracting scale and rotation invariant icons from an image. At block 122, an image of an object is provided in electronic form. At block 124, the list of coordinate point per cross-correlation structure is provided. At block 126, the icon angle is generated for each of the icons and stored appropriately for later use at block 128. At block 130, the icons are then normalized by appropriate scaling, as desired. At block 132, the icons are stored in a memory or other electronic storage device.

Figure 11:
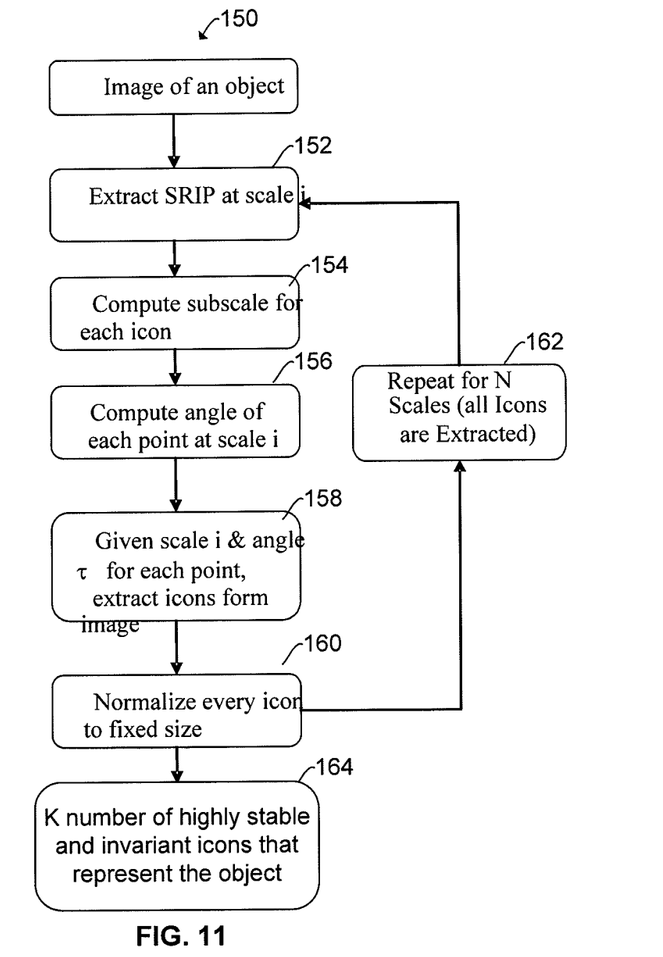

FIG. 11 illustrates another exemplary method 150 for extracting scale and rotation invariant icons from an image. At block 152, an image of an object is provided in electronic form. At block 154, scale rotation invariant points are extracted at a scale. At block 156, a subscale is computed for each icon. An extremum point is usually a peak at a scale and neighboring scales. Therefore, it is possible to compute subscale by taking the peak value at "best scale" and its neighboring scale. The scale of an icon becomes the scale of the cone-like structure plus or minus subscale. A well known method is parabola fit to find its peak in sub-position.

At block 158, the icon for each for each of the coordinates is computed for the scale. At block 160, given the icon angle and scale for each of the coordinates, extract icons from the image. At block 162, the icons are normalized to a fixed size. At block blocks 154 through 160 are repeated until all icons have been extracted. At block 164, a constant (K) of highly stable and invariant icons that represent the object are obtained and may be stored in a memory or other suitable storage device or pumped into an indexing data base or hash table.

Figure 12:
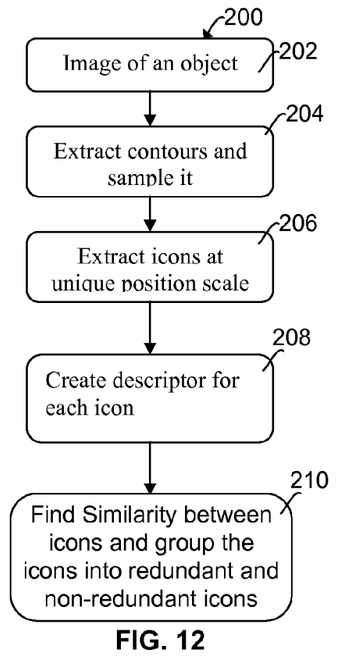

An exemplary method 200 for learning an object is illustrated in FIG. 12. At block 202, an image of an object is provided in electronic form. At block 204, an object contour point is extracted from an image of and sampled. The contours points may be used for hypotheses verification and to verify spatial relation between coordinates of unique points. In general, the unique points drive the attention and contour points verify the hypotheses. Sample points from the contour points are selected, which provides a fast verification process.

At block 206, SRI points acquired from the image and/or object to be learned are used to extract icons associated with the SRI points. In one embodiment, each icon has its (x, y) coordinate, size (scale) and angle. At block 208, a descriptor for each icon is created. In addition or in the alternative, each icon may also be tagged or otherwise associated with a learned object name.

At block 210, similar icons are found and tagged. Similar icons are generally suitable for recognition, but not unique enough for locating the object unless the spatial relation between the icons is applied such as, for example, nearest neighbor icon; n nearest neighbors; left, top, bottom, left neighbor; etc. Similar icons may have multiple correspondences. Blocks 202-210 are repeated for every object needed to be learned. Once learned, an object becomes a collection of icons (or their descriptors) and the spatial relation that ties the icons together is a set of object contour points. The icon coordinates also can be used for detecting, determining and/or verifying special relationships between the icons.

Using descriptors provides a variety of advantages. Such advantages include, for example, permitting the use of indexing techniques for fast retrieval of similar icons in a database of icons, which hastens retrieval of similar objects. This functionality is highly desirable when recognizing an object(s) from a large database of objects.

Figure 13:
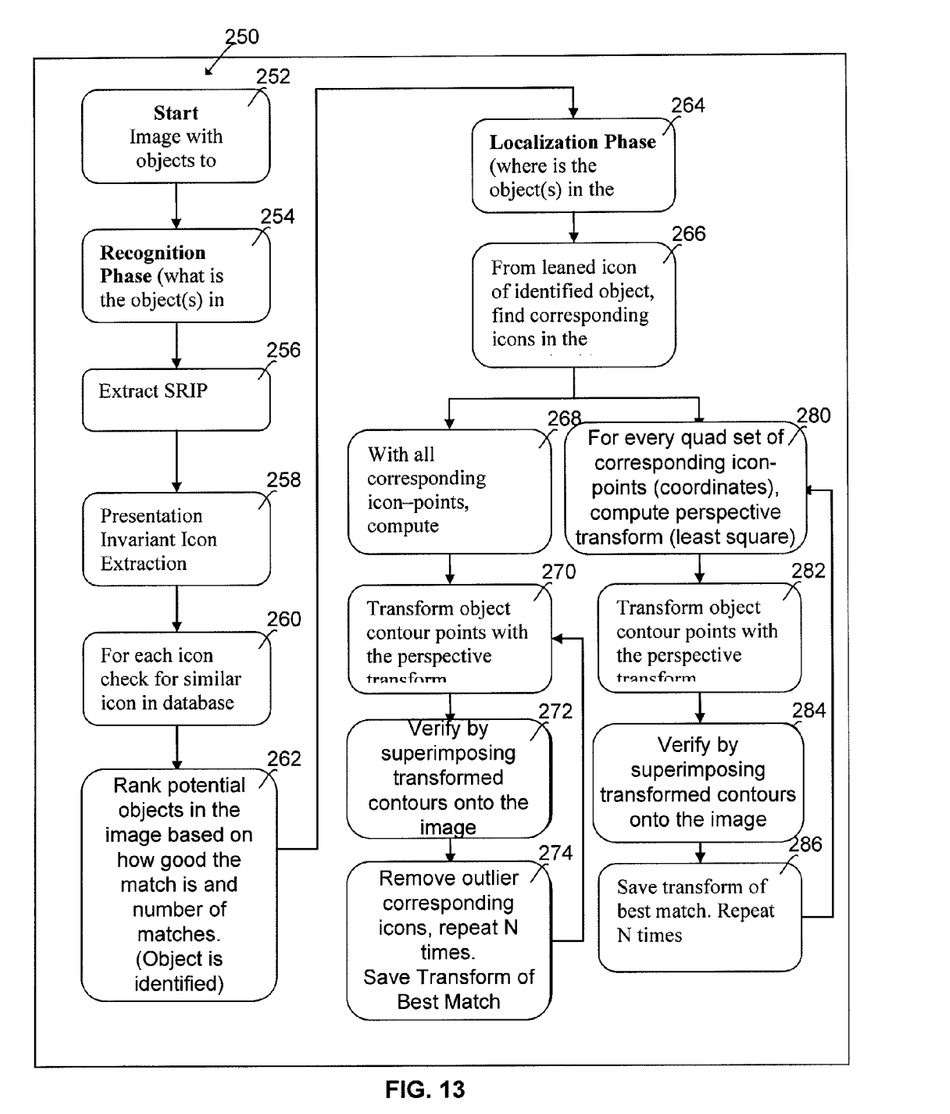

During the recognition phase, an object or multiple objects may exist in an image (scene image) and one goal is to recognize the object or multiple objects and provide the x and y coordinates of each object. An exemplary recognition method 250 is illustrated in FIG. 13. At block 252, an image having one or more objects to identify is provided in electronic form. At block 254, the recognition phase is initialized. At block 256, contour points are extracted from the image and SRI points are extracted from the image. At block 258, icons of the image are extracted at each of the unique points and normalized, as set described above. At block 260, for each extracted icon, a best matched icon is found or otherwise searched for in a database of icons using either a sequential method if number of learned object is small or an indexing method if the number of learned object is large.

At block 262, candidate objects in the image are identified and ranked based on the quality of the match and/or the number of matches. At block 264, the location of the object or objects is determined. At block 266, based on the learned icon or icons of an identified object or objects, corresponding icons in the recognized icons are found. This may be accomplished by a variety of methods.

One exemplary method begins at block 268. At block 268, all corresponding icons are used to compute a perspective transformation. This may be done by generating one or more hypotheses. The hypotheses may be generated in any desired manner. For example, all icons of learned object(s) may be selected, and compared with corresponding matched icons. Using a least square method correlation method or another correlation method, a perspective transform is generated between the learned unique point's coordinates and the corresponding matched points in the scene image. A least squares correlation method is generally preferred because there may be some outliers, at this juncture.

At block 270, the sampled learned contour points of candidate objects are transformed and superimposed on the scene image for verification. A match score between sampled contour and scene contour is computed. The transformation having the best contour match is selected. At block 272, using the transformation of the best match, all unique points of the learned object are transformed with the perspective transform onto the image. In addition, the distance between these transformed points and scene object unique points are computed. At block 274, any outlier corresponding icons are removed and the transform having the best match is saved for later use. Blocks 270 through 274 are repeated N times, where N is the number of corresponding icon points. Once this method has been applied N times, the transform having the best match is saved for later use.

Another method for obtaining precise localization of an icon is illustrated in blocks 280-286. Referring to block 280, for every quad set of corresponding icons points (e.g., coordinates), a perspective transform is computed using least squares or some other correlation method. At block 282, the object contour points with the perspective transform is transformed, in similar manner as block 270. At block 284, transformed contour points are transformed and superimposed onto the image to verify the transform, as discussed above with respect to block 272. At block 286, the transform producing the best match is saved and the process repeats N times (where N is the number of quad sets).

Figure 14A:
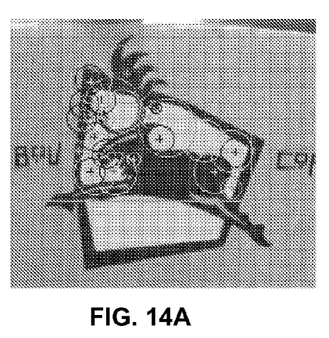
FIGS. 14A-14B illustrate exemplary objects having different scales and orientations in accordance with aspects of the present invention.
Figure 14B:
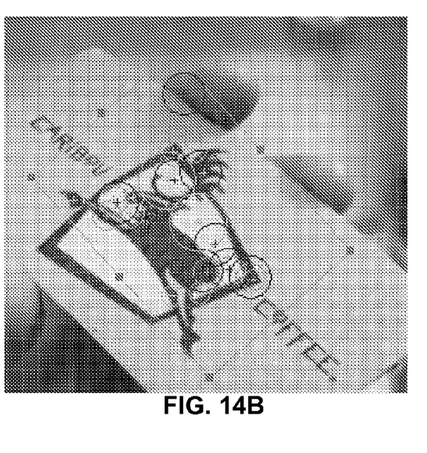

FIGS. 14A and 14B illustrate samples of unique points that are invariant to presentation. For example, FIG. 14A illustrates an object in an image, wherein the image was taken at a relatively close distance to the object and/or the image has been zoomed in around the object. FIG. 14B illustrates an image of the same object taken at a further distance and/or zoomed further out, and rotated, tipped and tilted than the image in FIG. 14A.

In operation, a method of generating the hypotheses picks a predetermined number of points (e.g., four points) of the leaned unique points and a predetermined number of corresponding points (e.g., four points) in the scene image. The process is repeated for N number of quad points. For every set of four points the perceptive transform is generated and sampled contour points are transformed and superimposed on the scene contour points. The transform of highest match between learned contours and scene contour is kept as the best transformation transform. For a set of ten matching icons between learned object and found object, there are 210 possible combination and, of course, 210 possible hypotheses generation and verifications. The speed of the recognition process (the entire process) for one learned object is about 140 millisecond using standard off the shelf Pentium based processor with 1.6 GHz processor speed. It is approximately 2 milliseconds extra for every learned object using sequential icon matching. This means, for example, that for 430 learned objects, a recognition would take 1 second ((1000−40)/2). A hash table based indexing would have the potential of achieving recognition of a million objects in one second.

As a practical contribution, the aspects of the present invention may be used in a wide variety of application including, for example, Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), applications wherein a closed-loop guidance and/or control system is utilized that requires a fast searching algorithm, etc.

Figure 15:
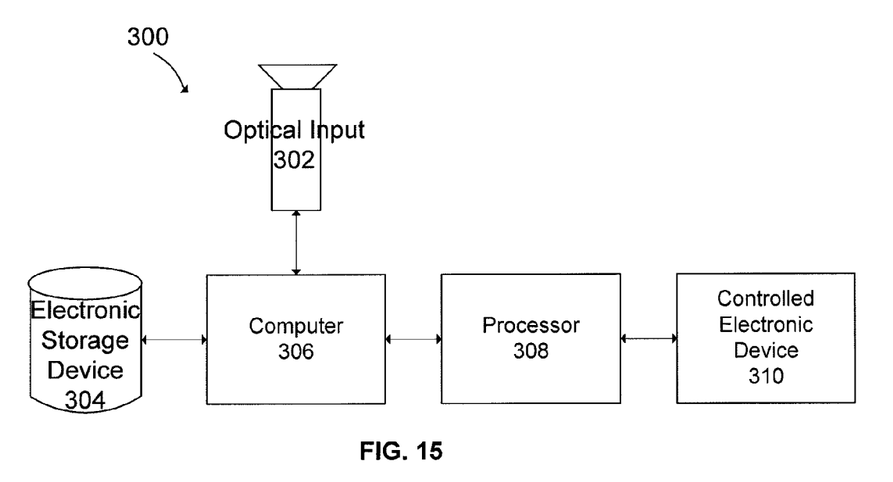
FIG. 15 is a block diagram of a system in accordance with aspects of the present invention.

FIG. 15 illustrates an exemplary feedback system 300 that may be used in accordance with the aspects of the present invention. The system 300 may include an optical input device 302 (e.g., a CCD camera) and/or an electronic storage device 304 for providing a learned image and/or a target image to a processor 306. The output of the devices 302, 304 may be input to a processor 306 that has computer code that is functional to carry out the desired functionality. The processor 306 may generate a control signal to a controller 308 (e.g., programmable logic controller) that may be used to control one or more electronic devices 310 (e.g., vehicle navigation system, tracking system, etc.). A feedback signal may be generated by the electronic device 310 to the controller 308 and/or processor 306 in order to control the particular application in which the invention is being applied.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

The invention claimed is:

1. A method for visual recognition of at least one object in an image, the method comprising:
    generating extremum information associated with the image by cross-correlating at least one structure across at least a portion of the image;
    extracting at least one icon from the image, wherein the icon includes at least one coordinate point associated with the extremum information;
    normalizing the icon to a fixed size; and
    storing icon information in a computer readable form, wherein the icon information includes one or more image values associated with at least a portion of the icon; and the at least one coordinate point associated with the extremum information.

2. The method of claim 1, wherein the extremum information includes a set of coordinate points for each extremum information.

3. The method of claim 2, wherein the extremum information further includes a radius for each extremum information.

4. The method of claim 1, further including determining an angle associated with the extremum information.

5. The method of claim 1, wherein the structure used to generate the extremum information is a cone-like structure.

6. The method of claim 1, wherein the structure used to generate the extremum information is a two-dimensional Gaussian shape.

7. The method of claim 1, wherein the structure used to generate the extremum information has a circular cross-section.

8. The method of claim 7, wherein the structure has a predetermined number of sizes and extremum information associated with the image is generated for each structure size.

9. The method of claim 4, wherein extremum information associated with a structure size is normalized by a common scaling factor.

10. The method of claim 9, wherein extremum information associated with two or more structure sizes is normalized using different scaling factors for each structure size.

11. The method of claim 1, wherein the icon information is stored in a database, wherein at least one entry of the database includes a description of the object.

12. The method of claim 1, wherein the icon information is stored in a descriptor vector.

13. The method of claim 1, wherein the extremum information is generated by extracting peak values from the step of cross-correlating.

14. A computer implemented method for learning objects for use in a visual recognition system, the method comprising:
    generating extremum information associated with one or more images, by cross-correlating at least one structure across at least a portion of the image over a plurality of scales;
    extracting at least one icon from the one or more images, wherein the icon includes at least one coordinate point associated with the extremum information;
    normalizing the icon to a fixed size; and
    storing icon information in a computer readable form as a learned object, wherein the icon information includes one or more image values associated with at least a portion of the icon; and the at least one coordinate point associated with the extremum information.

15. The method of claim 14, wherein the one or more images are captured using a plurality of perspective views and/or planes.

* * * * *